Figure 1:
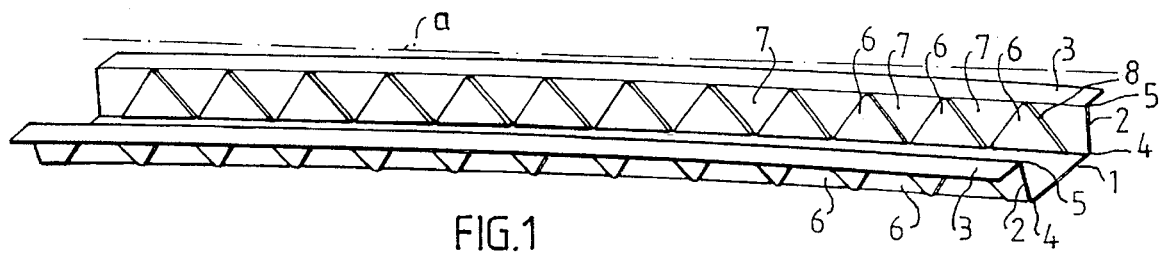

United States Patent

Persson

[11] Patent Number: 5,570,558
[45] Date of Patent: Nov. 5, 1996

[54] REINFORCING BEAM

[75] Inventor: Bengt Persson, Olofström, Sweden

[73] Assignee: AB Volvo, Gothenburg, Sweden

[21] Appl. No.: 244,242

[22] PCT Filed: Nov. 26, 1992

[86] PCT No.: PCT/SE92/00816

§ 371 Date: Jul. 25, 1994

§ 102(e) Date: Jul. 25, 1994

[87] PCT Pub. No.: WO93/11386

PCT Pub. Date: Jun. 10, 1993

[30] Foreign Application Priority Data

Nov. 26, 1991 [SE] Sweden .................... 9103495

[51] Int. Cl.$^6$ .................... E04B 2/32; B62D 25/00
[52] U.S. Cl. .................... 52/735.1; 52/731.1; 52/731.7; 52/740.2; 296/146.6; 296/188; 296/210
[58] Field of Search .................... 52/720, 730.1, 52/731.1, 731.6, 731.7, 735, 737, 738, 739, 740, 792, 735.1, 740.2; 296/146.6, 188, 210, 203, 214; 29/897, 897.1, 897.2, 897.3, 897.312, 897.32, 897.33, 897.34, 897.35

[56] References Cited

U.S. PATENT DOCUMENTS

| | | | |
|---|---|---|---|
| 440,007 | 11/1890 | Caldwell | 52/509 |
| 1,351,614 | 8/1920 | Brown | 52/731.6 |
| 2,145,407 | 1/1939 | Soule | 52/731.1 X |
| 2,355,707 | 8/1944 | De Boer | 52/731.6 |
| 2,549,442 | 4/1951 | Fischer et al. | 52/731.7 X |
| 3,137,922 | 6/1964 | Schumacher | 29/897.32 |
| 3,636,690 | 1/1972 | White | 52/731.7 X |
| 4,329,824 | 5/1982 | Lowe | 52/731.7 X |
| 4,453,364 | 6/1984 | Ting . | |
| 4,793,113 | 12/1988 | Bodnar . | |
| 4,796,946 | 1/1989 | Wilson et al. | 296/188 X |
| 4,938,525 | 7/1990 | Yamauchi | 296/188 X |

FOREIGN PATENT DOCUMENTS 9405872  3/1994  WIPO .................... 52/731.7

Primary Examiner—Carl D. Friedman
Assistant Examiner—Christopher Todd Kent
Attorney, Agent, or Firm—Young & Thompson

[57] ABSTRACT

A strengthening member consisting essentially of a bent sheet metal channel with opposing side walls which are provided with stiffening profiling. The profiling forms a uniform pattern of closely spaced indentations (6) separated by intermediate surface regions (7), which pattern extends along each channel wall (2), both the indentations (6) and the intermediate surface regions (7) extending over the entire height of the wall. The channel has a bottom interconnecting the side walls, the indentations having, in a direction parallel to the associated side wall (2), open bases at the bottom and closed apices at upper edges (5) of the walls. The intermediate surface regions (7) have, in a direction parallel to the associated side wall (2), open bases at the upper edges (5) and closed apices at the bottom.

7 Claims, 1 Drawing Sheet

REINFORCING BEAM

The present invention relates to a strengthening member, for example for reinforcing vehicle body panels such as roofs, consisting essentially of a bent sheet metal channel with opposing flanges which are provided with stiffening profiling.

It is generally known to make use of profiled or embossed strengthening members of bent sheet metal on car body panels, where the embossings are intended to stiffen the panel. One such strengthening member, in the form of a profiled channel member for reinforcing car doors, is shown in DE 2 021 906. The member is provided with uniformally distributed V-shaped indentations along its length which are relatively deep and spaced relatively far apart. The indentations extend over half the width of the base of the channel, half the wall region connected to the base and half of a flange or brim connected to the wall region. This known strengthening member has a relatively complicated shape and is intended to reinforce the door to achieve improved side impact protection.

It is a general object of the present invention to provide a strengthening member of the type described in the introduction, which has a profiling which can be obtained in a simple press operation when pressing the member, and which offers high stiffness with little shape change when removed from the press tool. More particularly, it is an object to provide a strengthening member having a "hat" shape which can be produced considerably more cheaply than those hat-shaped strengthening members which have been produced hitherto which do not display profiling.

This is achieved in accordance with the invention by means of the profiling forming a uniform pattern of closely spaced indentations separated by intermediate surface regions, which pattern extends along the channel walls and over the entire height of the walls.

In a preferred embodiment of the invention, the indentations and the surface regions have the same shape, for example triangular, and surface area, so that a continuous boundary line is created between them which extends in a zig-zag fashion between the transition section of the wall and base up to an upper edge of the wall. It has been shown that a strengthening member of this type can be produced for a third of the cost of a previously used press-hardened member for certain stiffening purposes. The profiling or embossing increases the strength so that press-hardening is no longer required, whilst at the same time eliminating superposed strains. This means that there is virtually no difference in shape between the finished member and the press tool, thereby considerably reducing the rejection rate.

Figure 2:
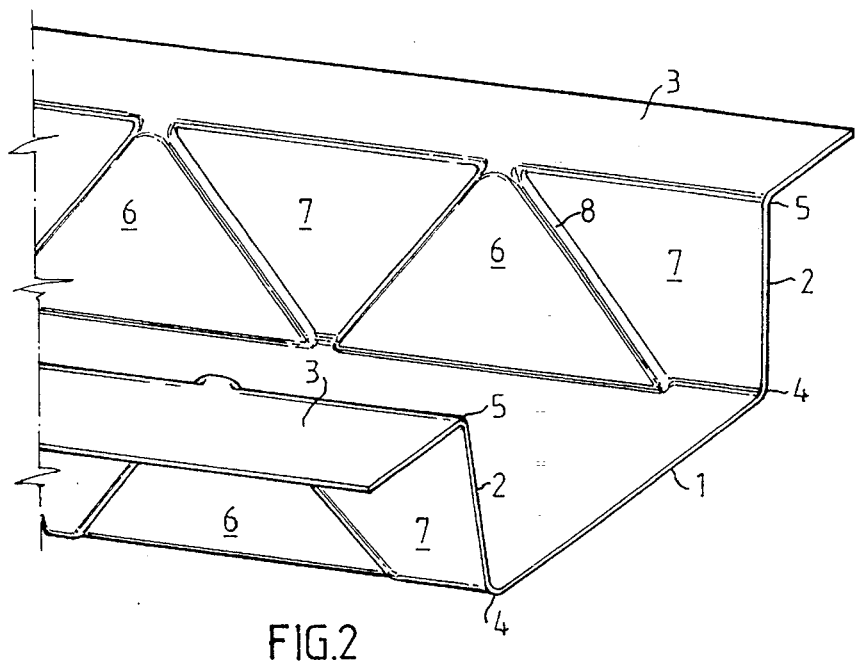

The invention will be described in greater detail by way of example only and with reference to the attached drawing, in which FIG. 1 is a perspective view of a preferred embodiment of a member according to the invention, and FIG. 2 is an enlargement of the right-hand end of the member shown in FIG. 1.

The member shown in the drawings has a "hat" shape formed by a base section 1, two side walls 2 projecting upwardly therefrom, and "brims" or flanges 3 projecting from the side walls 2. The member is produced by pressing a metal sheet so that transition sections 4 and 5 of small radius are formed between said parts. In FIG. 1, a straight reference line, denoted by "a", is drawn above the member in order to illustrate that the member is slightly bowed in the direction of its length. This allows the member to be adapted to the curvature of the body panel to which it is to be attached, such as a car roof.

When pressing a conventional "hat" shaped member with flat side walls, it is impossible to avoid a certain spring-back in the sheet metal when the member is removed from the press tool. This spring-back causes the member to flatten out somewhat so that its shape deviates from that of the press tool. A consequence of this can be that the shape of the flanges 3 deviates so much from the shape of, for example, the roof surface to which the flanges of the member are to be affixed that the member has to be rejected.

In order to i.a. eliminate the problem of spring-back, in accordance with the present invention the opposing side walls 2 are profiled or embossed so that each side wall 2 presents a uniform pattern of consecutive indentations 6 and intermediate surface regions 7 which, in the shown embodiment, are in the form of identically sized equilateral triangles having somewhat rounded tips. As is apparent from the drawing, a boundary surface 8 is formed between the indentations 6 and the intermediate surface regions 7. The boundary surface 8 extends in a zig-zag fashion between the upper and lower edges of the side walls, i.e. between the transition sections 4 and 5.

It has been shown that with such a pattern a deviation as low as 0.01 mm between the pressed member and the press tool can be achieved. In terms of strength, a member is attained which can be compared to a member with flat sides whose thickness is equal to the sheet metal thickness plus the depth of the indentations. It has been shown that the depth of the indentations should be between two and three times the thickness of the sheet metal. For example, a metal sheet of 0.8 mm thickness should have indentations to a depth of approximately 2 mm.

In the above, a member having triangular-shaped indentations has been described. Certain modifications to the purely triangular pattern can of course be made without departing from the scope of the present invention. Thus, the indentations can be trapezoid-shaped or formed with curved edges so that they present a more or less circular shape. However, it is important that the indentations are closely spaced and extend over the entire height of the side walls. The expression "closely spaced", as used in the appended claims, is meant to imply that the indentations either contact each other at a certain location, or present a small gap therebetween in relation to their longitudinal extension along the side walls, which gap does not exceed 25% of the extension of the indentations in said longitudinal direction.

I claim:

1. A strengthening member consisting essentially of a bent sheet metal channel with opposing side walls which are provided with stiffening profiling, the profiling forming a uniform pattern of closely spaced indentations (6) separated by intermediate surface regions (7), said pattern extending along each channel wall (2), both the indentations (6) and the intermediate surface regions (7) extending over the entire height of the wall, the indentations (6) and the intermediate surface regions (7) having such a shape that a continuous boundary line (8) is formed between said indentations and regions, said boundary line winding between a transition section (4) of the wall (2) and a base (1) of the channel up to an upper edge (5) of the wall.

2. Strengthening member according to claim 1, wherein the indentations (6) and the intermediate surface regions (7) have substantially the same shape and surface area.

3. Strengthening member according to claim 2, wherein the indentations (6) and the intermediate surface regions (7) are substantially triangular.

4. Strengthening member according to claim 1, wherein the indentations (6) in the side walls (2) have a depth about two to three times the thickness of the sheet metal.

5. Strengthening member according to claim 1, wherein the side walls (2) have flanges (3) projecting transversely in a single plane.

6. A strengthening member consisting essentially of a bent sheet metal channel with opposing side walls which are provided with stiffening profiling, the profiling forming a uniform pattern of closely spaced indentations (6) separated by intermediate surface regions (7), said pattern extending along each channel wall (2), both the indentations (6) and the intermediate surface regions (7) extending over the entire height of the wall, said strengthening member being slightly bowed in the direction of its length.

7. A strengthening member consisting essentially of a bent sheet metal channel with opposing side walls which are provided with stiffening profiling, the profiling forming a uniform pattern of closely spaced indentations (6) separated by intermediate surface regions (7), said pattern extending along each channel wall (2), both the indentations (6) and the intermediate surface regions (7) extending over the entire height of the wall, said channel having a bottom interconnecting said side walls, said indentations having, in a direction parallel to the associated said side wall (2), open bases at said bottom and closed apices at upper edges (5) of the walls, and said intermediate surface regions (7) having, in a direction parallel to the associated said side wall (2), open bases at said upper edges (5) and closed apices at said bottom.

* * * * *